United States Patent [19]

Jördens et al.

[11] Patent Number: 5,352,044
[45] Date of Patent: Oct. 4, 1994

[54] PLASTIC BEARING FOR STABILIZERS IN MOTOR VEHICLES

[75] Inventors: Ernst-Günter Jördens; Helmut Kammel, both of Damme, Fed. Rep. of Germany

[73] Assignee: Lemforder Metallwaren AG, Lemforde, Fed. Rep. of Germany

[21] Appl. No.: 101,398

[22] Filed: Aug. 3, 1993

[30] Foreign Application Priority Data

Apr. 21, 1993 [DE] Fed. Rep. of Germany ....... 4312958

[51] Int. Cl.$^5$ .................... F16C 33/74; F16C 27/06
[52] U.S. Cl. .................... 384/140; 384/143; 384/222; 384/295
[58] Field of Search .............. 384/130, 138, 140, 143, 384/147, 220, 222, 286, 295, 478, 435-437

[56] References Cited

U.S. PATENT DOCUMENTS

| | | | |
|---|---|---|---|
| 3,215,477 | 11/1965 | Arthur | 384/222 |
| 4,916,749 | 4/1990 | Urban et al. | 384/138 X |
| 5,013,166 | 5/1991 | Domer | 384/295 X |
| 5,263,778 | 11/1993 | Jördens et al. | 384/140 |

FOREIGN PATENT DOCUMENTS 2920404 12/1979 Fed. Rep. of Germany .
3531340 12/1989 Fed. Rep. of Germany .

*Primary Examiner*—Thomas R. Hannon
*Attorney, Agent, or Firm*—McGlew & Tuttle

[57] ABSTRACT

A plastic bearing consisting of an elastically deformable material for stabilizers in motor vehicles of a one-part design, slotted on one side in an axial plane, which can be opened for mounting, with an inner contact surface (6), which is slidingly movable on the jacket surface of the stabilizer and is delimited by sealing lip rings (19) at the axial ends, on which pockets (7) filled with a lubricant are provided between radially extending beads (20) and longitudinal ribs (21) extending axially between them, and which plastic bearing can be mounted in a housing under pretension. In order for such a plastic bearing to uncouple vibrations, on the one hand, and rotary and sliding movements, on the other hand, in the stabilizer as optimally as possible, the ratio of the diameter (DS) of the stabilizer (1) to the diameter (DV) of the radial beads (20) is inversely proportional to the ratio of the diameter (DS) of the stabilizer (1) to the diameter (DL) of the longitudinal ribs (21), and sealing lip rings (19) of a special dimension are provided at both axial ends of the contact surface.

5 Claims, 2 Drawing Sheets

PLASTIC BEARING FOR STABILIZERS IN MOTOR VEHICLES

FIELD OF THE INVENTION

The present invention pertains to a plastic bearing made of an elastically deformable material for stabilizers in motor vehicles wherein the bearing element is of a one-part design slotted on one side in an axial plane and openable for mounting and with an inner contact surface that is slidingly movable on a jacket surface of the stabilizer and is delimited by sealing lip rings at axial ends, the contact surface having pockets filled with a lubricant provided between radially extending beads and longitudinal ribs extending axially between the beads, the plastic bearing being mountable in a housing with an inner pretension.

BACKGROUND OF THE INVENTION

Such a plastic bearing, in which a cut extending in the longitudinal direction through the bearing body makes it possible to open the bearing body and to mount it on the stabilizer, has been known from German Offenlegungsschrift No. DE-OS 29 20 404. As a consequence of the elasticity of its material, the bearing body closes after having been placed on the () stabilizer so that it surrounds the stabilizer in a ring-like manner. Such a plastic bearing is held by an, e.g., U-shaped housing, which is detachably connected to the vehicle chassis. It combines the advantages of a molecular bearing with a permanently lubricated plain bearing in a design suitable for mounting on a stabilizer of a motor vehicle.

German Patent No. DE-PS 35 31 340 discloses a stabilizer bearing, which is completely divided into two bearing halves in a plane extending through the longitudinal axis of the bearing, and in which the sliding surface is provided on the outer circumference of an elastomeric body, so that a slide bush which surrounds the said elastomeric body and is inserted into a housing, is additionally necessary. In addition, the use of stiffening inserts made of a solid material in the elastomeric material for influencing the deformation characteristics of the bearing has been known from this document as well. To achieve an axially acting stop position, the slide bush is provided, at both of its ends, with a radial flange encasing the housing, and the elastomeric body and the stiffening inserts embedded therein are provided, at both ends, with a radial flange encasing the slide bush. Even though such a stabilizer bearing does meet high requirements, it consists of more individual parts than the aforementioned one-part plastic bearing.

SUMMARY AND OBJECTS OF THE INVENTION

The primary object of the present invention is to improve the vibration-compensating action of a plastic bearing of the class described in the introduction and to maintain its one-part, inexpensive design.

This object is attained according to the present invention in a plastic bearing possessing the characteristics described in the introduction, in which the ratio of the diameter of the stabilizer to the diameter of the radial beads is inversely proportional to the ratio of the diameter of the stabilizer to the diameter of the longitudinal ribs, wherein a plurality of sealing lip rings are provided next to each other at the axial ends of the contact surface, and the respective inner and outer sealing lip rings have an internal diameter and at least one additional sealing lip ring, which is located between these two sealing lip rings, has an internal diameter which is larger than the internal diameter of the two sealing rings 19.1 and 19.4.

The desired effect is achieved especially completely by such a design.

Four sealing lip rings are advantageously provided at each axial end of the support surface, and the respective outer sealing lip edges of these sealing lip rings have, at double pretension, the same ratio of stabilizer diameter to sealing lip diameter, and the middle sealing lip rings have, at simple pretension, the same ratio of the diameter of the radial beads to the stabilizer diameter.

The four sealing lip rings are arranged axially next to each other and have different diameters, the outer two sealing lips have a smaller internal diameter (the internal diameter being the diameter interiorly of the sealing lip rings defined by the tip end of the each sealing lip ring) as compared to two middle sealing lips. The two outer sealing lip rings have material subjected to a greater pretension in order to effectively prevent grease from being squeezed out of the interior space and preventing dirt from penetrating into the interior space. As the two inner sealing lips are stressed axially approximately equally from both sides, linear contact with the stabilizer bar or inner component is sufficient such that practically no friction forces occur.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS In the drawings.

DETAILED DESCRIPTION OF THE PREFERRED EMBODIMENT

Figure 1:
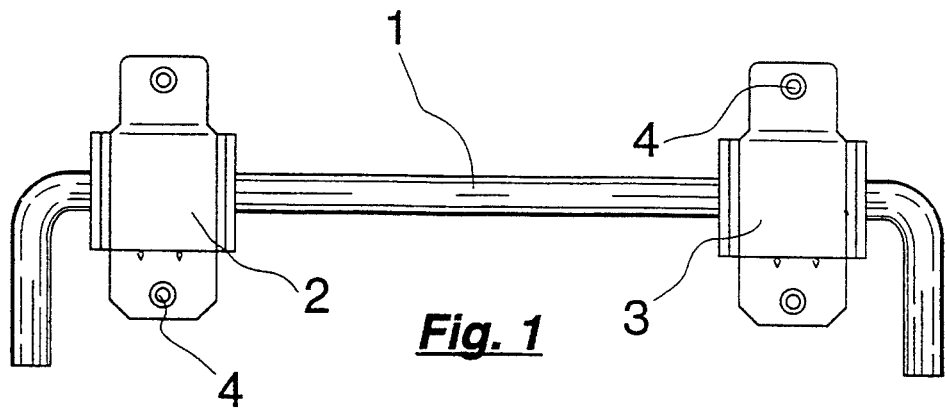
FIG. 1 is a schematic representation of a stabilizer with two bearings.

In FIG. 1, a stabilizer 1 of a motor vehicle is supported in two stabilizer bearings 2 and 3, which are attached to the vehicle chassis by means of screws 4 or the like.

Figure 2:
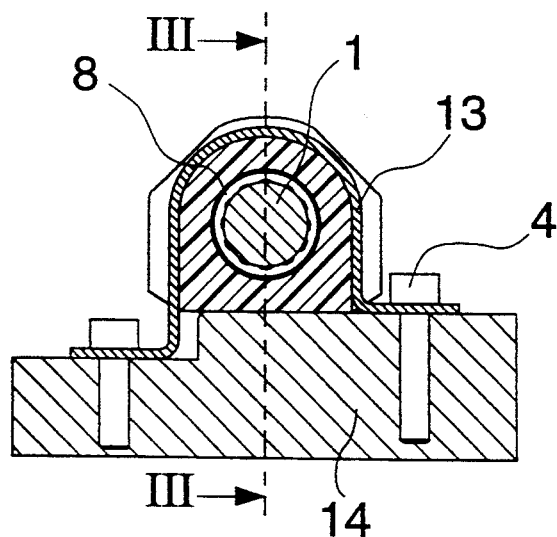
FIG. 2 is a cross sectional view taken through a clamped, mounted plastic bearing.
Figure 3:
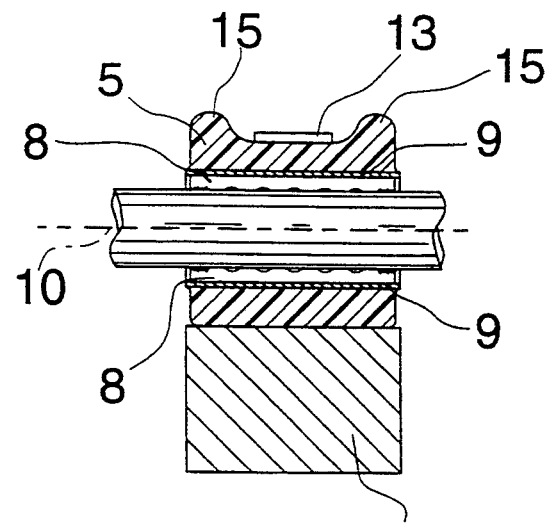
FIG. 3 is a sectional view taken along line III—III in FIG. 2.

A plastic bearing 5 is designed as a one-part bearing and consists of an elastomeric material. A contact surface 6, which is also the sliding surface, is located on the inside of the plastic bearing body. To ensure permanent lubrication of the sliding surface on the jacket surface of the stabilizer 1, pockets 7 filled with lubricant are provided on the contact surface 6 in shell-shaped areas 8 of the plastic bearing 5. The radial thickness of the shell shaped area 8 is smaller than the main wall thickness of the plastic bearing 5. In the exemplary embodiments shown in FIGS. 2 and 5, the two shell-shaped areas 8 are delimited by likewise shell-shaped inserts 9 made of a solid material, to which the elastomeric material of the plastic bearing 5 is connected on both sides (shell shaped area 8 and the main wall portion of the plastic bearing 5 are on both sides of the solid material 9 elastomeric material on both sides of solid material. However, the shell-shaped areas 8 have a higher rigidity than the elastomeric material of the plastic bearing 5. The plastic bearing 5 is slotted in a plane passing through the longitudinal axis 10, so that a slot 11 of defined width is formed in the pre-assembled state. A groove 12, which extends axially in parallel to the slot 11 and is diametrically opposite the axis 10, is provided, and both the slot 11 and the groove 12 have the same width in the example. The slot 11 makes it possible to open the plastic bearing 5, so that it can be placed on the stabilizer 1. Attachment to the vehicle chassis 14 is performed by a bell-shaped housing 13 by means of screws 4. The plastic bearing 5 is compressed, so that an inner pretension is generated, by which the shell-shaped areas 8 and the stiffening inserts are also compressed concentrically, until the limiting surfaces opposing each other at the slot 11 and in the groove 12, respectively, come into mutual contact with one another, and the shell-shaped areas 8 surround the stabilizer 1 on all sides, as is shown in FIGS. 2 and 3. To avoid axial movements of the plastic bearing 5 in the bell-shaped housing 13, radial ribs 15 are provided on the outer circumference of the plastic bearing 5.

Figure 7:
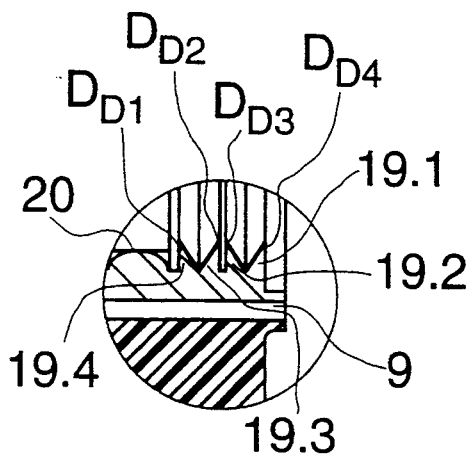
FIG. 7 is a detail view of the sealing lip design on an even larger scale than FIG. 6.
Figure 6:
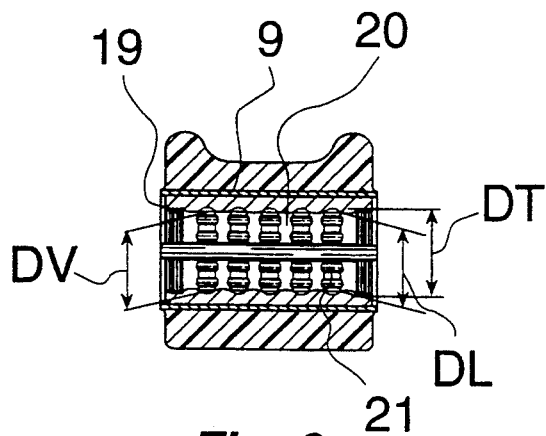
FIG. 6 is a longitudinal sectional view taken through a plastic bearing according to FIG. 5 on an enlarged scale.
Figure 8:
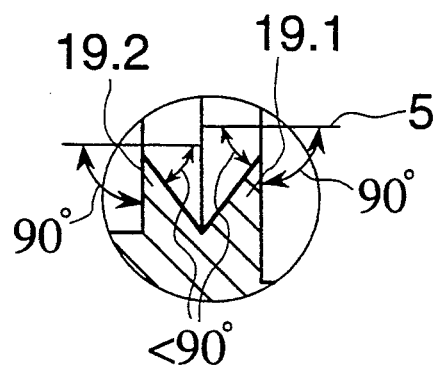
FIG. 8 is a detail view on an even larger scale than FIG. 7.

The design of the contact surface in the shell-shaped areas 8 of the plastic bearing is more evident from FIGS. 6 through 8. The contact surface is delimited by circumferential sealing lip rings 19 at the axial ends. The pockets 7 for the lubricants are located between radially extending beads 20 and longitudinal ribs 21 extending axially between them. To achieve optimal effect to the extent possible, the ratio of the diameter DS of the stabilizer 1 to the diameter DV of the radial beads is inversely proportional to the ratio of the diameter DS of the stabilizer 1 to the diameter DL of the longitudinal ribs 21. The base diameter is designated by DT in FIG. 6. Four sealing lip rings 19.1 through 19.4 are provided at the axial ends of the contact surface. The leg-forming side of the respective outer sealing lip ring 19.1 forms an angle of nearly 90°, while the inner leg side leads to the sealing lip edge at a smaller angle (FIG. 8). The respective inner sealing lip ring 19.4 is designed to be mirror-symmetrical, so that the leg surface forming the inside of the sealing lip ring forms an angle of nearly 90° with the horizontal, and the opposite leg side leads to the sealing lip edge at a substantially smaller angle. The two inner sealing lip rings 19.2 and 19.3 are also designed to be mirror-symmetrical to one another, corresponding to the above description. As can be seen in FIG. 7, the two inner sealing lip rings 19.2 and 19.3 have a larger internal diameter than the two outer sealing lip rings 19.1 and 19.4. The inner diameter defined by the sealing lip edge of the sealing lip rings 19.1 and 19.4 are related to the diameter DS of the stabilizer at a ratio that is inversely proportional to the ratio of the diameter DS of the stabilizer I to the diameter DL of the longitudinal ribs 20. The diameter ratio of the inner sealing lip rings 19.2 and 19.3 is also similar. The outer sealing lip rings 19.1 and 19.4 are thus mounted under double pretension compared with the sealing lip rings 19.2 and 19.3. Grease is prevented from being squeezed out of the stabilizer bearing and dirt is prevented from penetrating by this design to a much greater extent than is possible with prior-art designs.

Figure 4:
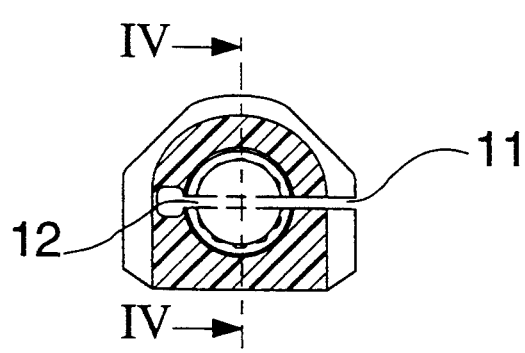
FIG. 4 is a cross sectional view taken through a plastic bearing of an exemplary embodiment that was modified compared with FIGS. 2 and 3.
Figure 5:
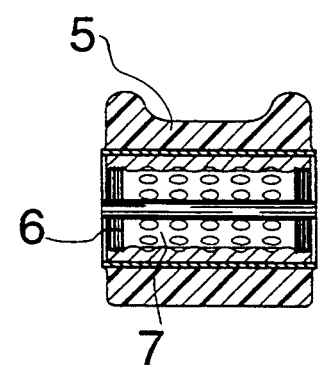
FIG. 5 is a sectional view taken along line V—V in FIG. 4.
Figure 10:
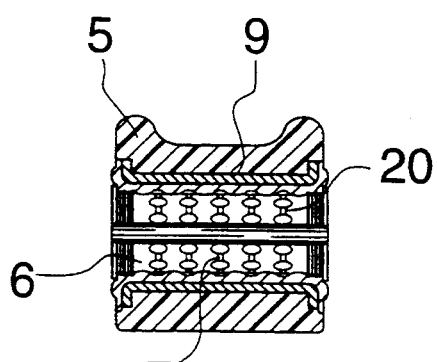
FIG. 10 is a longitudinal sectional view taken through an exemplary embodiment modified compared with FIG. 9.
Figure 11:
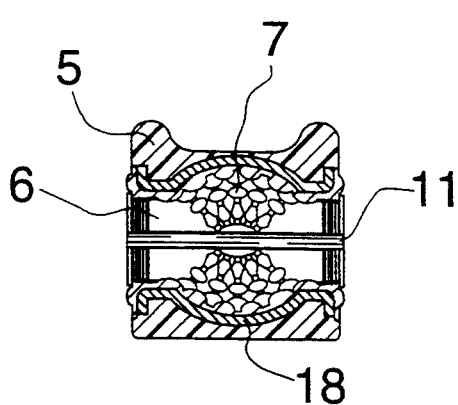
FIG. 11 is a longitudinal sectional view taken through another exemplary embodiment of a plastic bearing with inner stop limitation.
Figure 9:
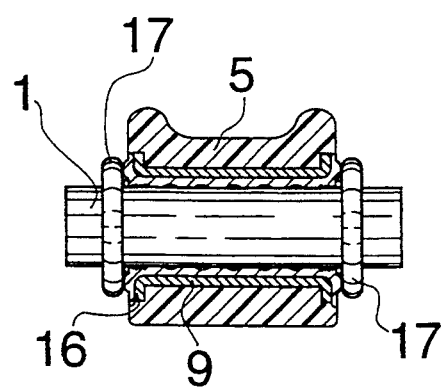
FIG. 9 is a longitudinal sectional view taken through another exemplary embodiment of a plastic bearing with axial stops.

The exemplary embodiment in FIGS. 9 and 10 shows a bearing design corresponding to the representation in FIGS. 4 and 5. However, the difference from the design of FIGS. 4 and 5 is the fact that the shell-shaped stiffening inserts 9 at both ends have a flange edge 16 bent radially to the outside, and that the material of the shell-shaped areas 8 extends around these bent areas on the outside of the flange edges 16 as well. Such a plastic bearing is arranged between two shoulder-like thickened areas 17 on a stabilizer 1, so that the elastic material at the axially outer surfaces of the flanges 16 forms elastic stops at the shoulder-like thickened areas 17 of the stabilizer 1. Instead of such an outer stop limitation for axial movements of the stabilizer bearing on the stabilizer, FIG. 11 shows as an example an inner, axial stop limitation. The inner contour of the plastic bearing 5 is designed here with a crowned expansion 18 for adaptation to a spherical thickened area of the stabilizer, as has been known in pivot bearings in the chassis of a motor vehicle.

Due to the series-parallel connection of the elastomer and the more rigid plastic, the overall rigidity of the bearing can be influenced corresponding to the rigidity necessary for handling the vehicle during practical use, without prejudice to the ability of the sliding zone to function.

What is claimed is:
1. Plastic bearing made of elastically deformable material for stabilizers in motor vehicles, the stabilizer having a stabilizer diameter, comprising:
   a one-part bearing include a slot on one side in an axial plane for opening the bearing for mounting;
   said one-part bearing having an inner contact surface that is slidingly movable on a jacket surface of the stabilizer, said inner contact surface being delimited by sealing lip rings at axial ends, said inner contact surface defining pockets filled with a lubricant, said pockets being provided between radially extending beads and longitudinal ribs extending axially between said radially extending beads, said plastic bearing being mounted in a housing with an inner pretension, said plastic bearing having a ratio of said stabilizer diameter to a diameter of said radial beads which is inversely proportional to a ratio of said stabilizer diameter to a diameter of said longitudinal ribs, said sealing lip rings being provided adjacent to each other at said axial ends of said contact surface and including an inner sealing lip ring and outer sealing lip ring and having at least one additional sealing lip ring positioned between said inner and outer sealing lip rings, said additional sealing ring having an internal diameter which is larger than an internal diameter of said inner sealing lip ring 2. Plastic bearing according to claim 1, wherein:
an inner and outer sealing lip rings are pretensioned more than said additional sealing lip ring.

3. Plastic bearing according to claim 1, wherein:
four sealing lip rings are provided at each axial end of said contact surface including said inner and outer sealing lip rings and two additional sealing lip rings positioned between said inner and outer sealing lip rings, said additional sealing lip rings having an inner diameter, said additional sealing lip rings being at simple pretension and said inner and outer sealing lip rings being double pretensioned.

4. Plastic bearing according to claim 1, wherein:
a leg-forming outer side of said sealing lip rings forms an angle of nearly 90° with the horizontal, an inner leg of said sealing lip rings leading to an sealing lip edge at a substantially smaller angle.

5. Plastic bearing made of elastically deformable material for stabilizers in motor vehicles, the stabilizer having a stabilizer diameter, comprising:
an one-part bearing include a slot on one side, in an axial plane, for opening the bearing for mounting, said one-part bearing having an inner contact surface that is slidingly movable on a jacket surface of the stabilizer, said inner contact surface being delimited by sealing lip rings at axial ends, said inner contact surface defining pockets filled with a lubricant, said pockets being provided between radially extending beads and longitudinal ribs, extending axially between said radially extending beads, said plastic bearing being mounted in a housing with an inner pretension, said sealing lip rings being provided adjacent to each other at said axial ends of said contact surface and including an inner sealing lip ring and outer sealing lip ring and having at least one additional sealing lip ring positioned between said inner and outer sealing lip rings, said additional sealing ring having an internal diameter which is smaller than said stabilizer diameter and larger than an internal diameter of said inner sealing lip ring and said outer sealing lip ring, said additional sealing lip ring being at simple pretension and said inner and outer sealing lip rings being double pretensioned whereby lubricant is substantially prevented from being squeezed out of said pockets and dirt is substantially prevented from penetrating to said inner contact surface.

* * * * *